United States Patent Office 3,651,172
Patented Mar. 21, 1972

3,651,172
METHOD FOR PREPARING LINEAR BLOCK COPOLYESTERS AND PRODUCT PRODUCED THEREBY
Kenneth T. Barkey and Lloyd I. Laird, Rochester, N.Y., assignors to Eastman Kodak Company, Rochester, N.Y.
No Drawing. Continuation-in-part of abandoned application Ser. No. 710,751, Mar. 6, 1968. This application May 5, 1969, Ser. No. 822,048
Int. Cl. C08g 39/10
U.S. Cl. 260—860                       19 Claims

ABSTRACT OF THE DISCLOSURE

A linear block copolyester which has good fiber- and film-forming properties and is solvent-spliceable with common low boiling organic solvents is prepared by blending a poly(ethylene phthalate) with a copolyphthalate of ethylene glycol and 1,4-cyclohexanedimethanol and heating the blend under controlled temperature conditions for a period of time sufficient to form block copolyester but insufficient for equilibration and randomnization to occur. The linear block copolyester is especially useful for manufacture of films, particularly photographic film base, and can be utilized as the sole film-forming material or as one or both of the outer layers of a laminated film having a core of poly(ethylene terephthalate).

---

This is a continuation-in-part of application Ser. No. 710,751, filed Mar. 6, 1968 now abandoned.

This invention relates in general to polyesters and in particular to a novel method for preparing linear block copolyesters, especially fiber- and film-forming linear block copolyesters, and to the resulting novel polyester product.

It is a well-established fact that polyesters with good fiber- and film-forming properties are those which are crystalline or can be induced to crystallize. Polyesters with good crystallization properties have high melting points and good mechanical properties such as high yield strength and good dimensional stability.

Unfortunately, the conventional polyesters, such as poly(ethylene terephthalate), with the above-mentioned good fiber- and film-forming properties have a number of disadvantages such as poor dyeability or low solubility in organic solvents. The latter shortcoming constitutes an especially serious problem when the polyester is used as a photographic film support. With conventional poly(ethylene terephthalate) films the splicing operation is time-consuming and requires expensive equipment and the application of heat and/or pressure, as well as special, expensive solvents or cements which are quite often toxic.

It is also well known that copolyesters have good dyeability and are readily soluble in a variety of organic solvents. The splicing operation can thus be accomplished much more easily with films of copolyesters than with films of simple polyesters.

Unfortunately, however, copolyesters tend to have poorer crystallization characteristics, lower melting points, and poorer mechanical properties than simple polyesters. Numerous attempts have, therefore, been made to prepare copolyesters which have on the one hand good dyeability, good solubility in organic solvents, and good splicing characteristics, and on the other hand a high melting point and good mechanical properties.

It has been found that so-called block copolyesters form a special class of copolyesters among which species with this highly desirable combination of properties can be found.

At this point it seems advantageous to give a definition and explanation of the term "block copolyester" and of other related terms which will be used throughout this specification.

The term "homopolyester" refers to polyesters wherein all polymer chains are constituted of one recurring structural unit. An example of such a homopolyester is poly(ethylene terephthalate), the structural unit of which is as follows:

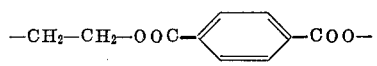

The term "copolyester" refers to polyesters with polymer chains which are constituted of at least two different structural units. The structural units may differ with respect to the acid moiety and/or diol moiety.

The term "polyester blend" refers to a physical mixture of two or more different polyesters wherein the molecules of the original polyesters are unchanged. The individual polyesters may be homopolyesters and/or copolyesters.

The term "random copolyester" refers to a copolyester which has the various structural units randomly distributed in the polymer chains. Such a random copolyester is, for example, obtained when two different diols are polycondensed with terephthalic acid dimethylester in the presence of a transesterification catalyst until an equilibrium state is reached. More precisely, among all possible copolyesters with the same ratio of structural units and the same average molecular weight the random copolyester is the one with the lowest specific free enthalpy at a given temperature and at a given pressure. In this specification the term "random copolyester" is used for all copolyesters which essentially fulfill the above requirements.

The term "block" stands for a sequence of identical structural units. The term "block copolyester" refers to a copolyester which has the various structural units distributed in a non-random manner. This type of copolyester is sometimes referred to as an ordered copolyester and may have any kind of distribution of the structural units in which the average block length is greater than the average block length of a random copolyester. The term "block copolyester" will be used in this specification for all copolyesters which essentially fulfill the above requirements. Of course, this term covers a broad range of copolyesters with different degrees of order. A block copolyester with a low degree of order resembles generally the corresponding random copolyester and a block copolyester with a high degree of order resembles generally the corresponding homopolyester.

It has been found that random copolyesters and low ordered block copolyesters quite often have a melting point which is 100° C. or more below the melting point of the higher melting of the corresponding homopolyesters. Highly ordered block copolyesters on the other hand quite often have melting points which are only a few degrees, generally not more than from 10 to 20° C., lower than the melting point of the higher melting of the corresponding homopolyesters.

It should be appreciated from the above discussion that block copolyesters are very desirable which have a degree of order that on the one hand is high enough to ensure a high melting point and that on the other hand is low enough to render the polyester soluble in common organic solvents and dyeable with common dyes.

According to one of the oldest known methods for preparing block copolyesters, a homopolyester having terminal hydroxyl groups is prepared, for example by reacting a diol with a dicarboxylic acid, or a suitable derivative thereof such as an ester or acid chloride, using an excess of the diol. A second homopolyester with terminal acid chloride groups is prepared by reacting a diol with a dicarboxylic acid chloride using an excess of the acid chloride. In the second homopolyester the diol and/or the acid chloride are different from those in the first homopolyester. The two homopolyesters are then interacted to form a block copolyester of higher molecular weight which is made up of blocks corresponding to the two initial polyesters. It should be noted that in such a block-copolyester-forming reaction essentially only the terminal groups react with each other so that the average block lengths are practically equal to the average chain lengths of the corresponding homopolyesters. This type of block-copolyester-forming reaction is highly desirable inasmuch as it leads to a block copolyester with a readily controllable degree of order, however, it has very serious disadvantages in some other respects.

The most serious disadvantage of the above-described known method for forming block copolyesters lies in the fact that acid chlorides are quite expensive and difficult to prepare. Further, the polycondensation of acid chlorides with diols is accompanied by the evolution of large amounts of poisonous hydrogen chloride which poses serious industrial problems.

The economically and technically most advantageous process for the preparation of polyesters which is commonly used today and which would be also highly desirable for the formation of block copolyesters employs as starting materials an ester of a dicarboxylic acid, such as dimethyl terephthalate, and a diol such as ethylene glycol. These substances are reacted in the presence of a transesterification catalyst such as zinc acetate/antimony trioxide at elevated temperatures. During the initial transesterification period the diol displaces the alcohol moiety of the original dicarboxylic acid ester, for example, methanol which escapes from the reaction mixture.

During the following reaction period the originally formed monomeric transesterification product polycondenses by way of a series of transesterifications whereby diol is liberated and removed by distillation at elevated temperatures and, optionally, reduced pressure so that the reversible transesterification reaction is pushed towards polycondensation products with greater chain lengths.

This reaction has been described in considerable detail herein because the present invention is concerned with the employment of this method for the production of block copolyesters. Attempts have previously been made to produce block copolyesters in this way, but they were unsuccessful due to certain special features of the transesterification polycondensation.

It should be understood that not only the chain ends react during this type of polycondensation. Generally all ester linkages in the polyester chain can undergo transesterification. It should be further understood that as long as the transesterification catalyst is present in the polyester and as long as the temperature is high enough transesterification occurs; and in the case in which no more diol is removed an equilibrium is established which is highly mobile and all the individual ester linkages anywhere in the polyester chains are undergoing perpetual transesterification. This is the reason why all prior attempts to produce block copolyesters by interacting two different homopolyesters in the presence of transesterification catalysts have failed. During the interation of the homopolyesters the blocks are rapidly broken down into smaller block lengths and this interaction proceeds in the direction of a random copolyester. This randomization process is fast and difficult to control and even occurs during the melt extrusion or during the molding of the final product.

Numerous attempts have been made to suppress the detrimental randomization process by choosing the structural unit of at least one of the homopolyesters such that it contains bulky groups in the alcohol and/or acid moiety. These groups have the effect of slowing down the transesterification reaction of the polyester because of steric hindrance. This effect is more pronounced at the ester linkages within the chain than at the end of the chain and therefore the sterically hindered blocks of a block copolyester are not so rapidly broken down and randomization is suppressed. However, sterically hindered starting materials are very expensive and difficult to prepare. Furthermore, the polycondensation of sterically hindered diols and dicarboxylic acid esters requires increased reaction temperatures and prolonged reaction times. Finally, the quality of the polyesters obtained therefrom is quite often inferior to the quality of polyesters made of customary simple starting materials such as terephthalic acid ester, and ethylene glycol or 1,4-cyclohexanedimethanol.

It is, therefore, an object of the present invention to provide a method for forming block copolyesters with a controlled degree of order from conventional, readily available diols and dicarboxylic acid esters by way of transesterification reactions.

According to the present invention this objective is achieved by blending and melting two different polyesters which have been separately prepared from one dicarboxylic acid ester and at least two different diols in the presence of a transesterification catalyst with subsequent heat treatment of the resulting polyester blend for a predetermined period of time. The first of the aforesaid polyesters is a poly(ethylene phthalate) and the second is a random copolyphthalate of ethylene glycol and 1,4-cyclohexanedimethanol with from about 8 to about 34 weight percent 1,4-cyclohexylenedimethylene groups, the phthalate groups being either terephthalate or isophthalate groups and said first and second polyesters being blended in a weight ratio of from about 40:60 to about 60:40.

It was found that the above-described method, which utilizes a homopolyester and a random copolyester as starting materials, results in high quality block copolyesters with a readily controllable degree of order. This is highly surprising, since methods which employ two homopolyesters as starting materials fail to give these results because of a too rapid randomization; and it would be expected that a method which employs starting materials one of which is already a random copolyester would lead to even a faster and less controllable randomization.

The block copolyesters which are formed according to the method of the present invention by heat treating the above-described blends in the presence of a transesterification catalyst randomize only slowly during the heat treatment and the formation of a completely randomized copolyester requires generally at least 120 minutes. Thus, the desired degree of order of the final block copolyester can easily be controlled by controlling the total time during which the blend and/or the block copolyester are in a molten state. This total time includes the time during which the block copolyester is in the molten state in a molding device or extruder for the formation of the final shaped article. It should preferably range from about 5 to about 90 minutes, and more preferably from about 5 to about 70 minutes.

During the "heat treatment" of the polyester blend, as herein described, the physical blend of two polyesters is in a state of progressive conversion into a block copolyester. This heat treatment is advantageously carried out at a temperature of from about 260° C. to about 310° C., and preferably at a temperature of from about 270° C. to about 290° C.

The intrinsic viscosity of the block copolyester, which is dependent upon the intrinsic viscosities of the starting polyesters, should be such that the block copolyester can be easily processed into the final article. It is preferred that the aforesaid first polyester have an intrinsic viscosity of from about 0.4 to about 1.0, and more preferably of from about 0.5 to about 0.8, and it is preferred that the aforesaid second polyester have an intrinsic viscosity of from about 0.4 to about 1.1, and more preferably of from about 0.6 to about 0.9. As long as one of the two starting polyesters meets this requirement, the other may have an intrinsic viscosity of up to 1.4.

It is preferred that the first and the second starting polyesters be polyterephthalates. The second polyester, which is a random copolyester, may contain 1,4-cyclohexylenedimethylene groups with either exclusively trans-configuration or exclusively cis-configuration. However, a content of cis-1,4-cyclohexylenedimethylene as well as trans-1,4-cyclohexylenedimethylene groups is preferred, and it is particularly preferred that the cis/trans ratio be 30:70. The second polyester contains preferably from about 11 to about 23 weight percent of 1,4-cyclohexylenedimethylene groups.

The quality of the end product may be controlled by adjusting the weight ratio of the first and second polyesters within the limits of from about 40:60 to about 60:40. A weight ratio of 50:50 is preferred.

It may be advantageous to subject the block copolyester to a powder build-up heat treatment at a temperature of from 190° C. to 240° C. In this case, the block copolyester melt is cooled and comminuted and then heat-treated in the solid state, for example in a fluidization chamber. The powder buildup technique is well known and is described, for example, in U.S. Pats. 2,901,466 and 3,075,952. A particular advantage of such a powder build-up stage lies in the fact that with proper control it may have an order increasing or blocking effect on the block copolyester which may at least partially compensate the randomization during the melt heating. This blocking effect has been described in detail in U.S. Pat. 3,117,950.

The heat treatment of the polyester blend may be effected in such a way that no increase of the average molecular weight occurs. If necessary, however, such a heat treatment, whether it is a melt heat treatment or a powder build-up heat treatment, can be effected under molecular weight increasing conditions with removal of ethylene glycol, for example at reduced pressures.

Various methods for blending the first and second polyesters can be used. According to a preferred method, the first and second polyesters are separately comminuted and the two powders are mixed and then heated until they form a homogeneous melt. However, other methods such as stirring the powder of one polyester into the melt of the other or mixing melts of the two polyesters can also be used. It is an important advantage of the present invention that the formation and heat treatment of the blend can be at least partially carried out in the extruder which is used for forming the final polyester article, such as a continuous flow extruder.

The techniques for preparing the starting polyesters are well known and are described, for example, in U.S. Pat. 3,342,782 and British Pat. 1,107,657. Generally all transesterification catalysts can be employed for the method according to the present invention. Such catalysts have, for example, been described in U.S. Pat. 2,465,319. A preferred group of catalyst systems comprises a zinc and/or manganese catalyst combined with a titanium and/or antimony catalyst. The system zinc acetate dihydrate/antimony trioxide is especially useful. Also, stabilizers such as phosphorus stabilizers can be employed in the present invention.

To prepare the poly(ethylene phthalate) utilized as a starting material in the method of this invention the reactants employed are the phthalic acid ester, e.g., dimethyl terephthalate, and ethylene glycol, while the reactants for preparation of the random copolyester are the phthalic acid ester, the ethylene glycol and the 1,4-cyclohexane dimethanol. Generally, the following conditions are maintained. A mixture of the reactants together with the catalysts is heated to about 180° C. and the methanol from the initial transesterification reaction is condensed and removed from the reaction system. As the reaction proceeds the temperature is increased until at the completion of the reaction the temperature reaches about 250° C. Excess glycol is then removed by application of reduced pressure as the polycondensation reaction is permitted to continue under vacuum until the desired melt viscosity is reached and the reaction halted by introduction of a nitrogen atmosphere, cooling, and the termination of agitation.

Since the boiling point of ethylene glycol is below 200° C., it is generally necessary to carry the initial transesterification to near completion below this temperature prior to proceeding to the polycondensation step. Alternatively, an excess of ethylene glycol can be used to compensate for the evaporation which occurs at temperatures above 200° C., thus permitting temperatures somewhat above 200° C. to be used during the initial transesterification. Generally, for economic reasons, the excess is limited to at most about 100%, however, much larger or smaller excess can be used depending upon the range of temperatures used to complete the initial transesterification. A compromise use of both a slight excess of ethylene glycol and temperatures above 200° C. can be employed with good results.

As a general rule the temperature of the system should be maintained below about 200° C. until from about 40 to about 60 percent of the total methanol which is to be released by the initial transesterification is collected. At this point temperatures above 200° C. can be used to drive the reaction with the excess of ethylene glycol mentioned above serving to compensate for the evaporation of glycol which occurs at the elevated reaction temperature. If higher temperatures are specified, i.e., those greater than 200° C., the reaction may be performed under pressure, whereby methanol is withdrawn to maintain desired reaction temperature and pressure.

The block copolyesters produced according to the method of the present invention have good crystallinity characteristics. Their melting points lie within the range of from 220° C. to 275° C. For many applications a melting point between 240° C. and 275° C. is preferred. The block copolyesters produced have good mechanical properties and are especially suitable for the manufacture of films and fibers; however, they can also be used for the manufacture of all other kinds of shaped polyester articles. It is an especially important advantage of the block copolyesters which are produced according to the present invention that they are readily spliceable with most of the common low boiling organic solvents, such as methylene chloride.

The block copolyesters produced according to the present invention can be processed into film material by casting or extrusion. The film can be oriented and heat set using conventional techniques such as drafting and tentering. Such films are very useful as a film support for photographic materials and are easily spliceable with low boiling solvents, such as methylene chloride, as well as with conventional splicing cements. These film materials can be coated with light sensitive gelatino silver halide layers of the type used in conventional photographic or cine films or with any other light or radiation sensitive layer, either with or without a subbing layer.

It may be especially advantageous to produce a laminated film which consists of a poly(ethylene terephthalate) film base which is laminated on one or both sides with the block copolyester produced according to the present invention. Such lamination can be preferably effected by simultaneous multiple dye extrusion of the poly(ethylene terephthalate) core and the block copolyester overcoating layer or layers. In this connection it is especially important that the block copolyesters produced according to the present invention are compatible with poly(ethylene terephthalate) so that sufficient adhesion between the layers of the laminate can be achieved and a cracking of the layers due to dissimilar physical characteristics, such as elastic moduli, yield strengths, and thermal expansion coefficients, can be avoided. In such a laminate the poly(ethylene terephthalate) layer may range in thickness from about 1 to about 10 mils and the block copolyester layer or layers may range in thickness from about 0.5 to about 5 mils.

The following examples illustrate the preparation of the block copolyesters described herein as well as the manufacture of films and laminated films utilizing such block copolyesters.

EXAMPLE 1

A mixture of 388 g. (2.0 mole) of dimethyl terephthalate, 81 g. (1.305 mole) of ethylene glycol, and 179 g. (1,243 mole) of 1,4-cyclohexanedimethanol (30:70 cis-trans ratio) is weighed into a one liter three-neck stainless steel resin flask. The mixture has a glycol-ester mole ratio of 1.27:1.0 and is charged with 0.085 g. of zinc acetate dihydrate (65 p.p.m. Zn) and 0.12 g. of antimony trioxide (245 p.p.m. Sb). The three-neck flask top is attached and connected to a vacuum tight stirrer, a stainless steel packed column with condenser and distillate collector, and a glass stopper. The contents of the resin flask are stirred and heated to 180° C. by partial immersion in a 260° C. salt ($NaNO_2$:$KNO_3$) bath. Methanol from the transesterification reaction is condensed and collected in a graduated cylinder in order to follow the course of the reaction. As the reaction proceeds, the temperature is increased to about 200° C. until about 50% of the total methanol to be released by the initial transesterification is collected by immersing the resin flask deeper into the 260° C. salt bath. When the transesterification is nearly completed (160 ml. of methanol collected), the resin flask is completely immersed and the final inside temperature of the mixture has reached 250° C. The packed column and condenser are then replaced with a solid receiver cooled in a Cellosolve-Dry Ice bath. Vacuum is applied slowly until excess glycol is removed. A vacuum (0.15 mm. Hg pressure) is then applied for the duration of the polycondensation reaction. When the melt viscosity reaches the desired value as determined by agitator load in milliamperes, the stirrer is halted and the vacuum released to nitrogen atmosphere. The molten polymer is poured and allowed to cool under nitrogen. The polymer, containing 62 mole percent cyclohexanedimethanol, is partially crystalline at room temperature and has a 217° C. melting point. The intrinsic viscosity (in phenol:chlorobenzene—60:40) is 0.45.

One part by weight of the copolyester so produced is comminuted and blended at room temperature with one part by weight of comminuted poly(ethylene terephthalate) having an intrinsic viscosity of 0.6. The blend is melted at 280° C. for 60 minutes, which is about equal to a conventional extrusion time. The block copolyester formed is extruded into 5 mil film which is subsequently oriented and heat set (crystallized) by tentering and drafting. The block copolyester has a melting point of 253° C. and yields strong splices in a conventional splicing process employing methylene chloride as the splicing solvent.

When a sample of the blend formed by mixing one part of the copolyester with one part of poly(ethylene terephthalate) is melted at 280° C. for about 2 hours, an equilibrated or randomized copolyester is produced, which has a melting point of about 180° C. and is unsuitable for use as a film base.

EXAMPLE 2

The block copolyester produced by the procedure of Example 1 is extruded and simultaneously laminated to both sides of poly(ethylene terephthalate) film base to yield a film base after stretching and heat setting of 5 mils thickness composed of one mil thick outer layers of the block copolyester on each side of a 3 mil thick layer of poly(ethylene terephthalate). The laminated film base is stretched and heat set by methods conventionally used in the manufacture of poly(ethylene terephthalate) film base. This film base is found to be similar in physical characteristics to poly(ethylene terephthalate) film base and readily spliceable by conventional techniques employing methylene chloride as the splicing solvent.

EXAMPLE 3

Similarly shown in Example 2, a 2 mil layer of the block copolyester of Example 1 is laminated to both sides of a 3 mil layer of poly(ethylene terephthalate) film base. This film base was stretched and heat set by conventional methods used in the manufacture of poly(ethylene terephthalate) film base. It is found to be physically similar to poly(ethylene terephthalate) film base; in addition, butt or lap splices of the film base are readily accomplished by conventional solvent splicing techniques.

While the examples set forth precise data for the block copolyester preparation, it will be understood that the absolute and relative quantities of the ingredients may be varied within the limits established by the disclosure while still obtaining satisfactory results.

The invention has been described in detail with particular reference to preferred embodiments thereof, but it will be understood that variations and modifications can be effected within the spirit and scope of the invention.

We claim:

1. A method of preparing a linear block copolyester, comprising the steps of blending a poly(ethylene phthalate) with a random copolyphthalate of ethylene glycol and 1,4-cyclohexanedimethanol comprising about 8 to about 34 weight percent of 1,4-cyclohexylenedimethylene groups in a weight ratio of said poly(ethylene phthalate) to said random copolyphthalate of from about 40:60 to about 60:40 and heating said blend in a molten state at a temperature of from about 260° C. to about 310° C. for a period of time which is sufficient to form said linear block copolyester but insufficient for equilibration and randomization to occur, said period of time being from about 5 to about 90 minutes and one of said poly(ethylene phthalate) or said random copolyphthalate having an intrinsic viscosity of from about 0.4 to about 1 and the other having an intrinsic viscosity of from about 0.4 to 1.4.

2. The method described in claim 1 wherein said blend is heated at a temperature of from about 270° C. to about 290° C. for a period of about 5 to about 70 minutes.

3. The method described in claim 1 wherein both said poly(ethylene phthalate) and said random copolyphthalate are polyterephthalates.

4. The method described in claim 1 wherein said poly(ethylene phthalate) has an intrinsic viscosity of about 0.4 to about 1.0 and said random copolyphthalate has an intrinsic viscosity of about 0.4 to about 1.1.

5. The method described in claim 1 wherein said poly(ethylene phthalate) has an intrinsic viscosity of about 0.5 to about 0.8 and said random copolyphthalate has an intrinsic viscosity of about 0.6 to about 0.9.

6. The method described in claim 1 wherein said random copolyphthalate comprises about 11 to about 23 weight percent of 1,4-cyclohexylenedimethylene groups.

7. The method described in claim 1 wherein said poly(ethylene phthalate) and said random copolyphthalate are blended in a weight ratio of 50:50.

8. The method described in claim 1 wherein said random copolyphthalate is a copolyphthalate of ethylene glycol and a mixture of cis-1,4-cyclohexanedimethanol and trans-1,4-cyclohexanedimethanol with a cis to trans ratio of 30:70.

9. The method described in claim 1 wherein heating of said blend is at least partially carried out in an extruder which is used to form a shaped article from the linear block copolyester.

10. The method described in claim 1 wherein heating of said blend is at least partially carried out under a reduced pressure.

11. The method described in claim 1 additionally comprising the step of subjecting said block copolyester to a powder build-up heat treatment at a temperature of from 190° C. to 240° C.

12. The method described in claim 1 wherein said poly(ethylene phthalate) and said random copolyphthalate are separately powdered, the two resulting powders are mixed together, and the mixture is heated to form a homogeneous melt.

13. The method described in claim 1 wherein said poly(ethylene phthalate) and said random copolyphthalate are separately melted and the two resulting melts are blended together.

14. The method described in claim 1 wherein one of said poly(ethylene phthalate) and said random copolyphthalate is powdered and the other is melted and said powder is stirred into said melt.

15. A method of preparing a linear block copolyester, comprising the steps of blending poly(ethylene terephthalate) having an intrinsic viscosity of from about 0.4 to about 1 with a random copolyester having an intrinsic viscosity of from about 0.4 to about 1.1 of dimethyl terephthalate, ethylene glycol and 1,4-cyclohexanedimethanol, comprising about 8 to about 34 weight percent of 1,4-cyclohexylenedimethylene groups, in a weight ratio of said poly(ethylene terephthalate) to said random copolyester of from about 40:60 to about 60:40 and heating said blend at a temperature of from about 270° C. to about 290° C. for a period of from 5 to about 70 minutes.

16. A linear block copolyester produced by the method of claim 1.

17. A linear block copolyester produced by the method of claim 15.

18. A film prepared from a linear block copolyester produced by the method of claim 1.

19. A film prepared from a linear block copolyester produced by the method of claim 15.

References Cited

UNITED STATES PATENTS

| 2,901,466 | 8/1959 | Kibler et al. | 260—860 |
| 3,265,762 | 8/1966 | Quisenberry | 260—860 |
| 3,331,889 | 7/1967 | Caldwell et al. | 260—860 |
| 3,418,393 | 12/1968 | King | 260—857 |

FOREIGN PATENTS

| 993,122 | 5/1965 | Great Britain | 260—860 |
| 1,040,470 | 8/1966 | Great Britain | 260—860 |
| 1,136,148 | 12/1968 | Great Britain | 260—75 |
| 1,443,401 | 5/1966 | France | 260—75 |

WILLIAM H. SHORT, Primary Examiner

E. WOODBERRY, Assistant Examiner